US007222549B2

(12) United States Patent
Abney

(10) Patent No.: US 7,222,549 B2
(45) Date of Patent: May 29, 2007

(54) SYSTEMS AND METHODS FOR DETERMINING THE LOCATION OF A PIG IN A PIPELINE

(75) Inventor: Laurence J. Abney, Katy, TX (US)

(73) Assignee: Halliburton Energy Services, Inc., Duncan, OK (US)

(*) Notice: Subject to any disclaimer, the term of this patent is extended or adjusted under 35 U.S.C. 154(b) by 181 days.

(21) Appl. No.: 10/993,853

(22) Filed: Nov. 19, 2004

(65) Prior Publication Data

US 2006/0107773 A1    May 25, 2006

(51) Int. Cl.
*F16L 55/48* (2006.01)
(52) U.S. Cl. ..................................... 73/865.9
(58) Field of Classification Search ............. 73/865.9, 73/37; 702/150
See application file for complete search history.

(56) References Cited

U.S. PATENT DOCUMENTS

| 2,698,363 | A |   | 12/1954 | Rush ........................ 200/61.41 |
|---|---|---|---|---|
| 3,298,399 | A | * | 1/1967 | Slade .......................... 138/97 |
| 3,903,728 | A | * | 9/1975 | Matthews, Jr. ........... 73/40.5 R |
| 3,903,730 | A | * | 9/1975 | Matthews et al. ....... 73/40.5 R |
| 4,419,892 | A | * | 12/1983 | Goolsby et al. ........... 73/865.8 |
| 5,453,944 | A |   | 9/1995 | Baumoel et al. ............... 703/2 |
| 5,659,142 | A | * | 8/1997 | Lima et al. ................. 73/865.8 |
| 5,927,901 | A | * | 7/1999 | Graves ....................... 405/158 |
| 7,100,463 | B2 | * | 9/2006 | Boudreaux ............. 73/865.9 X |

FOREIGN PATENT DOCUMENTS

| JP | 55044929 A | * | 3/1980 | ............. 73/861.05 |
|---|---|---|---|---|
| JP | 61038536 |   | 2/1986 | .................. 73/861 |
| JP | 08233932 A | * | 9/1996 | |
| JP | 2006192407 A | * | 7/2006 | |
| WO | WO 00/16002 A | * | 3/2000 | |

OTHER PUBLICATIONS

McGillivray, et al; *Halliburton Using Acoustic Telemetry To Track Pigs In Flowlines*; Pipeline & Gas Journal; Mar. 2003; www.pipelineandgasjournal.com; 3 pages.
"The State of the Art of Pipeline Pig Location and Tracking" by Jason A. Farque, 1996 XP002364322, Jan. 24, 2006 6 pages.
Foreign communication from related counter part applicaiton dated Nov. 14, 2005, Forms 210,220,237 PCT/GB2005/004377.

* cited by examiner

*Primary Examiner*—Thomas P. Noland
(74) *Attorney, Agent, or Firm*—John W. Wustenberg; Conley Rose, P.C.

(57) ABSTRACT

The location of a pig in a conduit, e.g., an underwater pipeline, may be determined by measuring an amount of a fluid displaced by the pig from the conduit and calculating the location of the pig in the conduit based on that amount of fluid. In particular, the amount of the fluid displaced by the pig may be measured using a flow meter positioned near an exit of the conduit. This amount may then be transmitted to a computer for calculating the location via, for example acoustic telemetry. The location of the pig may then be transmitted from the computer to a receiving device for receiving and displaying the location.

18 Claims, 1 Drawing Sheet

SYSTEMS AND METHODS FOR DETERMINING THE LOCATION OF A PIG IN A PIPELINE

BACKGROUND

The present invention generally relates to pipelines, and more particularly to systems and methods for determining the location of a pig in a pipeline based on the amount of fluid being displaced by the pig from the pipeline.

Devices known as pigs are commonly placed in and propelled through pipelines by the flow of fluid therein. The pigs may serve various functions in a pipeline, including cleaning the pipeline to ensure that the flow of fluid therethrough is not obstructed, inspecting the interior of the pipeline, and/or separating different fluids flowing through the pipeline. Pipeline pigs are also employed during a dewatering phase of pre-commissioning operations. Such dewatering may occur after the pipeline has been filled with water and pressurized to test whether it has any defects and will be capable of withstanding the pressures that will be experienced during the normal operation of the pipeline. After the testing is complete, a pig (or series of pigs) is typically placed in the pipeline and acts as a positive barrier between the water and a gas such as air that is used to displace the water from the pipeline.

It is desirable to know the location of the pig as it transits through the pipeline. If the location of the pig is not known, the pig receiver, which is located at one end of the pipeline, might be removed before the pig actually reaches the receiver. If a pig is discovered to be missing or not received, the downtime required to replace the pig receiver and displace the pig from the pipeline can be costly. Various methods have been developed for detecting the location of the pig. One such method involves using an acoustic tracking system, an acoustic signal is emitted from a device that is attached to the pig. The acoustic signal is at a pre-set frequency and this signal can be tracked as the pig transits through the pipeline. Another method is to monitor the pressure of the fluid in the pipeline and the pressure of the gas that is being used to displace the fluid from the pipeline. However, due to the compressibility of gas and other environmental factors the use of pressure measurements to determine the location of a pipeline pig is usually inaccurate. In another method, a radioactive source may be placed in the pig and a detector located outside the pipe responds to the radiation emitted by the pig as it passes a detector. Unfortunately, the radioactive source is dangerous to use and special procedures and training must be followed when handling the radioactive source. A need therefore exists for a simple, accurate method of tracking the location of a pig in a pipeline.

SUMMARY

Methods of determining the location of a pig in a conduit, e.g., an underwater pipeline, include measuring an amount of a fluid displaced by the pig from the conduit and calculating the location of the pig in the conduit based on the amount of displaced fluid. The amount of the fluid displaced by the pig may be measured using a flow meter positioned near an exit of the conduit. Further, the location of the pig may be calculated using a computer. The location of the pig may then be transmitted via, for example, acoustic telemetry on the sea-bed or underwater, to a receiving device for receiving and displaying the location.

Systems for determining the location of a pig in a conduit include a flow meter disposed in the conduit for determining an amount of a fluid displaced by the pig from the conduit. The flow meter may be positioned near an exit of the conduit. The systems may also include a computer for calculating the location of the pig based on the amount of the fluid and a receiving device for receiving and displaying the location of the pig. The receiving device may be located near a surface of a body of water or of the earth. The systems may further include a transmitter for transmitting data from the flow meter to the computer and a transmitter for transmitting the location of the pig from the computer to the receiving device.

DETAILED DESCRIPTION

Figure 1:
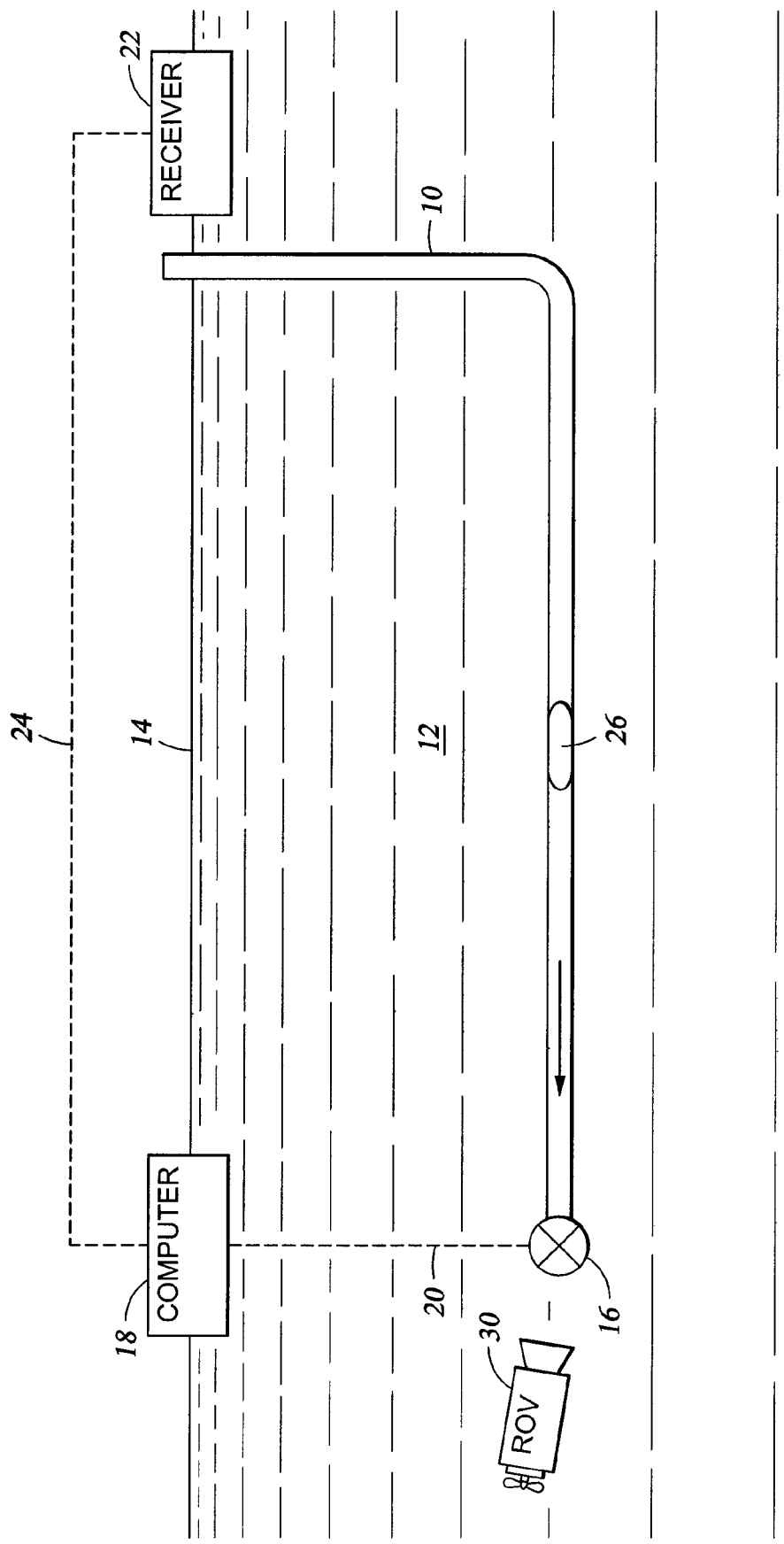
FIG. 1 is side plan view of a system for determining the location of a pig in an underwater pipeline.

A pig may be inserted at one end of a conduit and propelled with compressed gas to the other end of the conduit. The pig may be placed in the conduit behind a fluid such as water having been used for test purposes during a pre-commissioning project. The conduit may be, for example, a pipeline extending underground, underwater, or both for transporting hydrocarbons. The location of the pig as it passes through the conduit may be determined by measuring an amount of fluid displaced from the conduit by the pig and then calculating the location of the pig based on this amount of the fluid. This method of determining the location of the pig is relatively accurate. As used herein, "amount" refers to the mass and/or volumetric flow rate of the fluid for a given period of time. After the pig reaches the pig receiver at the exit end of the conduit, the conduit can be used for its primary purpose of transporting a particular fluid. Being able to accurately detect the location of the pig ensures that no downtime will occur due to mistakenly believing that the pig has been removed from the conduit and later discovering that it still remains therein. As such, the costs of such downtime can be avoided.

FIG. 1 illustrates in more detail how the location of the pig 26 may be determined. It specifically depicts an embodiment of a system for determining the location of the pig 26 in an underwater pipeline 10. The underwater pipeline 10 extends at one or both ends from above the surface 14 of a body of water 12 to a location at a depth below the surface 14 such as on the seafloor. Alternatively, the pipeline 10 may terminate at one or both ends below the surface 14, for example at an undersea wellhead, template, or terminal. It is understood that pipeline 10 may be arranged in various other positions such as between two different points in the water, between the surface of the earth and an underwater location, or between two different points underground. A flow meter 16 is disposed near an exit end of pipeline 10 for measuring the amount of fluid passing out of pipeline 10. In embodiments, flow meter 16 may comprise a mass and/or volumetric flow meter that measures the flow rate of the fluid (i.e., unit mass and/or volume per unit time), a cumulative volumetric flow meter that measures the cumulative volume of fluid exiting the pipeline for a given period of time, a cumulative mass flow meter that measures the cumulative mass of fluid exiting the pipeline for a given period of time, or combinations thereof. Examples of suitable flow meters include but are not limited to a turbine flow meter, a mass flow transducer, orifice plates and combinations thereof.

A pig 26 may be placed in pipeline 10 behind a fluid present therein. A gas pump or compressor may then be used to cause a pressure differential across the pig 26, thereby forcing the pig 26 to move through pipeline 10. A device suitable for moving through the interior of a conduit may be employed as the pig 26. The particular type of pig to be used and its shape may depend on several factors such as the type and volume of the fluid to be removed by the pig and the purpose of using the pig. In one embodiment, the pig 26 may be used to inspect the interior of pipeline 10. In another embodiment, the pig 26 may be used to displace a fluid from pipeline 10 such as during the dewatering phase of a pre-commissioning project. In yet another embodiment, the pig 26 may be used to separate dissimilar fluids from each other. In still another embodiment, the pig 26 may be used to clean the interior of pipeline 10 by removing solid or semi-solid deposits therefrom. Examples of types of pigs include but are not limited to mandrel pigs that typically comprise a central body tube or mandrel and at least one component attached to the mandrel, foam pigs that typically comprise a polyurethane foam and polyurethane discs and/or abrasive materials permanently bonded to them, solid cast pigs that typically comprise a molded polymer, spherical pigs that typically comprise a solid composition or a flexible material inflated with glycol and/or water, gel pigs that typically comprise a series of gelled liquid systems, and in-line inspection tools designed to gather data.

As the pig 26 is propelled from the entrance to the exit of pipeline 10, flow meter 16 measures the amount of fluid that exits pipeline 10 ahead of the pig. In an embodiment, this amount may be the flow rate of the fluid. In this case, the period of time over which the flow rate is measured also may be determined. In alternative embodiments, the amount may be the volume of the fluid or the mass of the fluid.

The system in FIG. 1 may also include a computer 18 for recording and calculating the location of the pig 26 based on the amount of fluid measured by flow meter 16. The computer 18 may be located above (as shown) or below the surface 14 of water 12. Further, it may be disposed a finite distance away from the other components in the system as shown, or it may be integrated with or located near the other components such as flow meter 16 or receiving device 22. The data collected by flow meter 16 may be transmitted to computer 18 as indicated by dotted line 20. Any suitable transmission means may be employed. In an embodiment, the transmission of such data may be performed via acoustic telemetry, which is a wireless technique that works well underwater. Although not shown, the HAL-AT acoustic telemetry system sold by Halliburton, Inc. would be suitable for achieving the transmission. The acoustic telemetry system may include a transponder unit and an underwater transmitter. In alternative embodiments, the data may be transmitted between flow meter 16 and computer 18 via a radio signal or via wired system such as an electrical signal or fiber optic.

The computer 18 may be programmed to calculate the current location of the pig based on the amount of fluid measured by flow meter 16. In particular, computer 18 may be programmed to first convert the amount of fluid into a volume amount unless the cumulative volume amount has been measured. For example, if the mass or volume flow rate of the fluid is measured, the flow rate may be multiplied by the total time during which the flow rate is measured to obtain the cumulative mass or volume of the fluid. If the cumulative mass of the fluid is calculated or measured, that mass may be divided by its specific gravity to obtain the volume of the fluid. The volume calculated by computer 18 represents the volume of fluid that has been displaced by the pig. The computer 18 may also be programmed to use this volume to determine the volume of the pipeline through which the pig has passed in accordance with the following equation:

$$V_P = V_T - V_F$$

where $V_P$ represents the volume through which the pig has passed, $V_T$ represents the total volume inside the pipeline, and $V_F$ represents the volume of fluid displaced by the pig. The length of pipeline through which the pig has passed may then be determined in accordance with the following equation:

$$L = V_P/(\pi * r^2)$$

where L represents the length of the pipeline through which the pig has passed and r represents the internal radius of the pipeline. This L also indicates the location of the pig relative to the entrance of pipeline 10. The computer 18 may then record and/or transmit the calculated location of the pig.

The system shown in FIG. 1 additionally includes a receiving device 22 for receiving and displaying the location of the pig 26 and any other information desired such as the volume of fluid that has passed out of pipeline 10. This information may be transmitted from computer 18 to receiving device 22 as indicated by dotted line 24. In embodiments, this transmission may be accomplished via acoustic telemetry, an electrical or optical signal, or a radio signal as described above. The receiving device 22 may be positioned at a location where those monitoring the location of the pig can access and view the information displayed by receiving device 22. In an embodiment, the receiving device may be positioned near surface 14 as shown. If desirable, adjustments can be made to the flow rate of the gas being injected into pipeline 10 based on the displayed information. The foregoing process of determining the location of the pig in pipeline 10 can be repeated continuously, thereby allowing the movement of the pig to be traced down the pipeline.

In an alternative embodiment similar to the one shown in FIG. 1, a remote operated vehicle (ROV) 30 having a video camera may be employed to read the flow meter and communicate this reading to an operator at the surface. The operator may then enter the reading into a computer that is programmed to calculate the location of the pig in the same manner as described above. This location may then be transmitted in the manner described above to a receiving device that displays the location of the pig to the operator.

While exemplary embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference in their entirety.

What is claimed is:

1. A method of determining a location of a pig in a conduit, comprising:
    (a) measuring an amount of a fluid displaced by the pig from the conduit; and
    (b) calculating the location of the pig in the conduit based on the amount of the fluid,
    wherein the amount of the fluid is measured using a flow meter positioned near an exit of the conduit.

2. The method of claim 1 wherein flow meter is a mass flow rate meter, a volumetric flow rate meter, or both.

3. The method of claim 2, wherein calculating the location comprises determining a volume of fluid displaced from the conduit based on the data from the flow meter.

4. The method of claim 3, wherein calculating the location comprises subtracting the volume of fluid displaced from a total volume of the conduit and dividing the remainder by the cross-sectional area of the conduit.

5. The method of claim 1, wherein the conduit comprises an underwater pipeline.

6. The method of claim 1, further comprising transmitting the location of the pig to a receiving device for receiving and displaying the location.

7. The method of claim 6, wherein the receiving device is located near a surface of a body of water or of the earth.

8. The method of claim 6, wherein the location of the pig is transmitted to the receiving device via acoustic telemetry.

9. The method of claim 6, wherein the location of the pig is transmitted to the receiving device via an electrical signal.

10. The method of claim 6, wherein the location of the pig is transmitted to the receiving device via a radio signal.

11. The method of claim 1, further comprising using a remote operated vehicle (ROV) to read and communicate the amount of the fluid from the flow meter.

12. The method of claim 1, wherein the location of the pig is calculated using a computer.

13. The method of claim 1, wherein the location of the pig is calculated using a computer.

14. The method of claim 13, further comprising transmitting the amount of the fluid from the flow meter to the computer before step (b).

15. The method of claim 14, wherein the amount of the fluid is transmitted via acoustic telemetry.

16. The method of claim 14, wherein the amount of the fluid is transmitted via an electrical signal.

17. The method of claim 14, wherein the amount of the fluid is transmitted via a radio signal.

18. The method of claim 1, further comprising repeating steps (a) and (b) to trace the pig as it moves through the conduit.

* * * * *